United States Patent Office 2,717,230
Patented Sept. 6, 1955

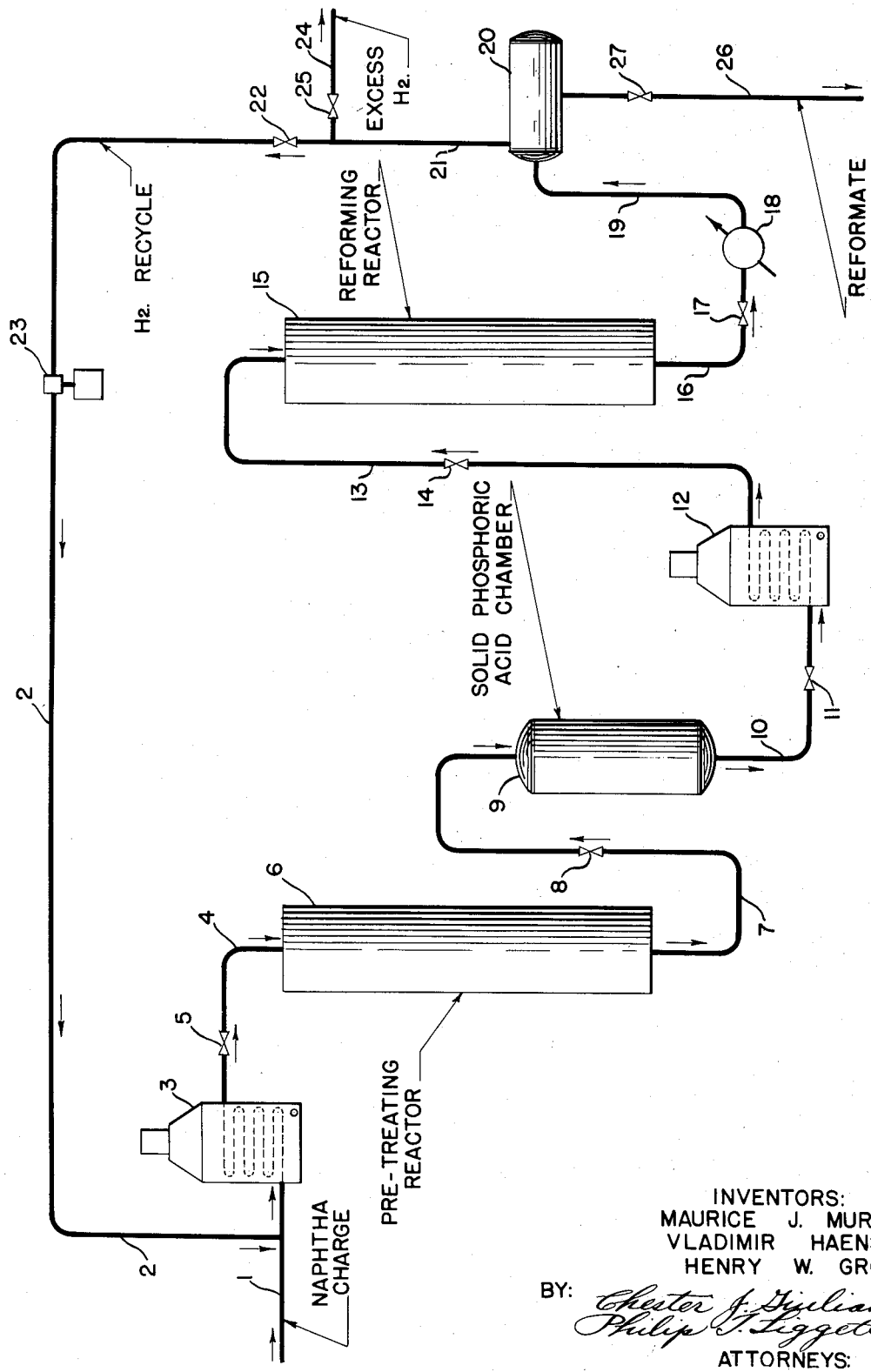

2,717,230

CATALYTIC REFORMING OF HYDROCARBON CHARGE STOCKS HIGH IN NITROGEN COMPOUNDS

Maurice J. Murray, Naperville, and Vladimir Haensel and Henry W. Grote, Hinsdale, Ill., assignors to Universal Oil Products Company, Chicago, Ill., a corporation of Delaware Application June 19, 1951, Serial No. 232,394

7 Claims. (Cl. 196—50)

This invention relates to a method for effecting the catalytic conversion of hydrocarbon fractions having a large concentration of nitrogen compounds. It is more specifically concerned with a method of catalytically reforming thermally cracked gasoline or naphtha, or mixtures of the latter with a straight run gasoline or naphtha, where the thermally cracked material is obtained from highly nitrogenous crudes and thus has a high content of nitrogen compounds.

In processing straight run naphthas blended with thermally cracked naphthas or gasoline fractions, or thermally cracked fractions alone, it is frequently desirable to subject the charge stream to a pre-hydrogenation or pre-saturation step, wherein the charge is passed in contact with a hydrogenation catalyst or a hydrogenation-dehydrogenation catalyst while in the presence of a hydrogen stream in order that a relatively large portion of the olefin content of the charge stream may be converted to provide a substantially saturated stream. Also, similar charge streams having a relatively high sulfur and nitrogen content, may be passed with hydrogen over a hydrogenation catalyst, which is sulfur resistant. Resulting ammonia and hydrogen sulfide may be removed from the system prior to effecting the catalytic reforming of the charge stream by conventional removal methods, however, it has been found that the use of a catalyst comprising platinum and alumina, and particularly platinum-alumina catalyst containing combined halogen, such as fluorine and/or chlorine, are especially useful in the reforming of saturated hydrocarbons, and in general are substantially sulfur resistant. In other words, by the use of an improved reforming catalyst of the type mentioned, it is possible to effect the catalytic reforming of charge stocks which have a high sulfur content and there is little or no poisoning of the catalyst itself over substantially long periods of operation. Further, it has been found that the use of the improved platinum-alumina and combined halogen catalysts may be used for a number of weeks and even months without regeneration, by an appropriate selection of operation conditions, of temperature, pressure, space velocity, and hydrogen to hydrocarbon ratios. However, unlike the sulfur compounds it has been found that nitrogen compounds in the charge stream have a depressing effect on the hydrocracking reaction within reforming step, and in general nitrogen compounds appear to poison the catalyst so as to adversely effect the desired dehydrogenation, and hydrocracking reactions, particularly over long periods of operation.

It is therefore a principal object of this invention to provide a method for effecting the catalytic reforming of hydrocarbon fractions high in nitrogen compounds, as well as sulfur, peroxides, phenols, etc., so that a non-regenerative type of reforming catalyst may be used for extended periods of time without being subjected to poisoning or other deleterious effects from these undesirable portions of the charge stream.

It is a further object of the present invention to provide an improved processing arrangement which pretreats or pre-hydrogenates and hydrocracks the charge stream and then contacts the resulting charge stream with an acidic medium prior to catalytic reforming, in order to eliminate any depressing effects on the conversion in the latter stage.

It is a still further object of the invention to provide an improved solid phosphoric acid as an acidic contacting medium in an intermediate stage, in order that nitrogen compounds may be absorbed and removed from the charge stream under substantially high temperature conditions, prior to reforming, and in a manner precluding separation or fractionation of the treated charge stream prior to passing it to the catalytic reforming step.

Broadly, our invention relates to an improved process for reforming a gasoline fraction containing substantially large quantities of nitrogen compounds, which comprises, effecting the cracking of the nitrogen compounds therein in the presence of excess hydrogen and a catalytic agent to form ammonia, passing the resulting product stream containing ammonia into contact with an acidic medium and thereby removing ammonia from the fraction, and subjecting the substantially nitrogen free gasoline fraction to reforming in the presence of a reforming catalyst.

The prehydrogenation and cracking of the charge stream may be carried out at a somewhat lower temperature than that for the reforming stage, say in the range of from about 600° to 950° F. and a pressure greater than about 100 p. s. i. g. The hydrogenation of olefins in the charge effects the formation of more saturated materials, while the cracking reaction forms primarily resulting ammonia from the nitrogen compounds in the charge stock. The catalyst in the pretreating step may comprise various of the well known hydrogenation-dehydrogenation catalysts, including chromium, molybdenum, tungsten, nickel or cobalt, and the sulfur resistant catalysts of cobalt-molybdate or cobalt thiomolybdate on an alumina carrier. However, preferably in accordance with the present invention which provides a reforming process which may be carried on for an extended period of time without regeneration, the pretreating catalyst is similar to the reforming catalyst and comprises platinum and alumina and combined halogen, with the catalyst used under conditions of lower temperature, higher space velocity, and higher hydrogen/hydrocarbon ratio which substantially appears to preclude excessive carbonization or poisoning of the catalyst by sulfur and nitrogen compounds in the charge stock.

The acid medium used for the removal of ammonia from the resulting pretreated stream, may include sulfuric acid, boric acid, aluminum sulfate, hydrofluoric acid, etc., but preferably comprises a solid phosphoric acid catalyst which may be used in a fixed bed reactor chamber. The solid phosphoric acid catalyst may be a fresh material, or perhaps a spent material which has been used in the polymerization unit, but preferably is a specially prepared catalyst which has been calcined to about 600° to 1000° C., and provides a high stability catalyst which will effect less polymerization of the charge stream.

The solid phosphoric acid referred to hereinabove, comprises a manufactured solid catalyst comprising primarily a polyphosphoric acid and a siliceous adsorbent material. Of the various acids of phosphorus, ortho-phosphoric acid ($H_3PO_4$), pyrophosphoric acid ($H_4P_2O_7$), and triphosphoric acid ($H_5P_3O_{10}$), or other polyphosphoric acids may be used, with the concentration of the particular acid varying to provide a desirable catalyst which is both active and stable. The adsorbent material or carrier which is compounded with the phosphoric acid is predominately of siliceous character and may include diatomaceous earth, kieselguhr, artifically prepared silica, and certain members of the class of aluminum silicates including such naturally occurring substances as the various fuller's earths and clays, such as bentonite, montmorillonite, acid-treated clays and the like. The method of manufacture of the usual types of solid phosphoric acid catalysts are in general well known to those familiar with the petroleum conversion art.

The calcination treatment of the solid catalysts may be carried out by heating the dried catalyst mixture in a substantially inert gas, such as air, nitrogen, and the like. The preferred solid phosphoric acid used in the present invention is, however, calcined to a higher temperature than that normally used in the preparation of a polymerization catalyst, and as noted is within the range of from about 600° to 1000° C.

In a somewhat more specific embodiment, our invention relates to an improved combined pretreating and reforming process for a gasoline fraction containing substantially large quantities of nitrogen compounds detrimental to the reforming catalyst and depressing the desired reactions of the reforming step, which comprises, contacting the charge fraction, in the presence of excess hydrogen, with a hydrogenation catalyst suitable to effect the cracking of the nitrogen compounds in the stream, passing the contacted stream with resulting ammonia into contact with a solid acidic medium and effecting the removal of the ammonia from the gasoline fraction, and then subjecting the resulting nitrogen free gasoline to catalytic reforming in the presence of a platinum-alumina, combined halogen catalyst whereby to effect a gasoline of enhanced octane number.

Still more specifically, the conditions of operation are such that although a lower temperature range is used, a higher space velocity, or charge rate is effected in the first stage treating reactor, as well as a higher hydrogen to hydrocarbon ratio maintained therein. Thus, there is eliminated to a large extent the poisoning and carbonization effect on the catalyst in this first stage of contact.

The resulting hydrocracked or hydrogenated stream from the pretreating stage may, under some conditions, be cooled and subjected to separation providing a gaseous phase and a liquid phase, which in turn permits treating of the hydrogen containing gaseous phase to remove hydrogen sulfide, and a separate treating of the liquid phase to remove dissolved ammonia and nitrogen compounds, in which case the separately treated phases are then combined, heated, and subsequently passed through a reforming stage from which a product stream may be withdrawn as reformate and excess hydrogen formed which may be separated and recycled to the pretreating step. A preferred operation, however, as provided by the present invention, passes the entire effluent stream from the pretreating stage directly through a guard chamber having a bed of solid phosphoric acid catalyst without intentional cooling. Thus, the various intermediate steps of cooling, fractionating or separating, and separately treating the gaseous and liquid phases may be substantially eliminated. The resulting treated stream from the guard chamber may, of course, be heated to a suitable temperature to effect the catalytic reforming in the latter step in the presence of the substantially nonregenerative platinum-alumina, combined halogen catalyst. It is, in general, difficult to define and set forth the exact nature of the deteriorating or depressing effect of nitrogen compounds in the charge stocks which are subjected to catalytic reforming. However, it appears that thermally cracked stocks which have nitrogen containing materials provide ammonia and perhaps other basic nitrogen components which are detrimental to the acidic component of a reforming catalyst, and also harmful to the improved substantially nonregenerative type platinum-alumina, combined halogen catalyst as provided in a preferred embodiment of this invention and which is now widely used in the petroleum field, particularly deteriorating the hydrocracking and dehydrogenation effect of the catalyst after relatively long periods of operation.

The features and advantages of the present improved operation for effecting the purification of these more undesirable form of nitrogen containing charge stocks which require prehydrogenation prior to catalytic reforming, will be more apparent upon reference to the accompanying drawing and to the following description in connection therewith.

Referring now to the drawing, there is indicated diagrammatically a simplified embodiment of improved combined pretreating and catalytic reforming process as provided by the present invention. The nitrogenous charge stream passes by way of line 1 in admixture with hydrogen from line 2 into heater 3, which is suitable to heat the charge stream, to a temperature of from about 500° F. to about 900° F. The hydrogen from line 2 is normally recycled hydrogen prepared as hereinafter described. The resulting heated charge stream and hydrogen is passed by way of line 4 and control valve 5 into the pretreating reactor 6 at a pressure above at least 100 p. s. i. g. and at relatively high weight hourly space velocity of say from 4 to 20. The weight hourly space velocity is defined as the weight of hydrocarbon charged per hour per weight of catalyst in the reaction zone. Also, a high hydrogen to hydrocarbon molal ratio of range of say 2 to 10 is maintained to prevent excessive carbon formation. In the reactor 6, the charge stream contacts a suitable hydrogenation catalyst in the presence of the excess hydrogen provided by way of line 2 whereby to effect the saturation of olefins within the charge stream, while at the same time and in accordance with the present invention, the stream is subjected to a sufficiently high temperature to effect hydrocracking and a break-down of the nitrogen compounds therein to form primarily ammonia.

The resulting pretreated and cracked stream from reactor 6 passes by way of line 7 and valve 8 into an acid chamber 9. While various acidic media may be utilized within this chamber 9, preferably solid phosphoric acid is used which is suitable to react with and remove the resulting ammonia in the charge stream. The treated and substantially nitrogen free hydrocarbon charge may continuously be passed by way of line 10 and valve 11 to an intermediate heater 12 which in turn is suitable to heat the charge stream of from about 750° F. to about 1000° F. and discharge the resulting high temperature stream by way of line 13 and valve 14 to a catalyst containing reforming reactor 15.

In accordance with the present invention, an improved platinum-alumina, combined halogen catalyst is used, whereby reforming may be carried out for an extended period of time in a substantially non-regenerative type of operation. The pressure should be greater than about 100 p. s. i. g., the weight hourly space velocity should be within the range of from about 0.5 to about 20, and the hydrogen to hydrocarbon ratio may lie within the range of about 1.0 to about 8.0. The paraffins in the charge stream are isomerized and hydrocracked within reactor 15, while naphthenes are dehydrogenated to aromatics, and because substantially no olefins are present in the charge, as well as substantially no nitrogen compounds, then with a proper hydrogen to hydrocarbon ratio, the catalyst contributes a long life with little or no poisoning and carbon formation.

The effluent from the reactor 15 is passed through line 16, valve 17 and cooler 18, and from the latter through line 19 into receiver 20. The receiver is maintained at a temperature and pressure such that substantially only hydrogen is in a gaseous state. Hydrogen is withdrawn through the upper line 21 and valve 22 and passed to a compressor 23, from which it may be discharged into line 2 and recycled through the reactors, as hereinbefore set forth. Excess hydrogen may be withdrawn by way of line 24 and valve 25.

The condensed hydrocarbons within receiver 20 consist primarily of reformate and some normally gaseous hydrocarbons and may be withdrawn by way of line 26 and valve 27. The octane number of the reformate is, of course, substantially higher than that of charged stock.

In a more specific embodiment of the improved operation, a platinum-alumina, combined halogen catalyst is utilized in both the pretreating reactor and the reforming reactor and/or reactors. The platinum content and the platinum-alumina combined halogen catalyst may be present in substantially large amounts, however, for economical reasons and as well as for product yield and quality reasons, the platinum content usually will be within the range of from about .05% to about 1.5%. The catalyst will ordinarily contain only relatively minor amounts of halogen usually less than about 3% on a dry alumina basis, especially in the case of fluorine and chlorine.

In a specific operation, 200–400° F. E. P. fraction of a thermally cracked gasoline, or a blend thereof with some straight run gasoline, may be heated to a temperature of about 800° F. in heater 3, with hydrogen from line 2 and the mixture passed into the pretreating reactor 6. A relatively high H₂/HC ratio of the order of say 6 mols of H₂ to one of hydrocarbon is maintained in the pretreating reactor, and also a relatively high space velocity of say of the order of 8 is maintained while contacting the platinum-alumina combined halogen catalyst. The resulting pretreated stream may leave reactor 6 at a somewhat higher temperature than the charge temperature, say of the order of 875° F. and without cooling pass directly into contact with a solid phosphoric acid catalyst in chamber 9 wherein substantially all resulting ammonia may be adsorbed and removed from the stream. While the present drawing indicates only one contacting chamber 9, it is of course not intended to limit the present direct flow arrangement to the use of only one reactor, for the resulting pretreated stream may be charged through different beds of acid catalyst by the use of a suitable switching operation. Preferably, the solid phosphoric acid catalyst is of the type as used in polymerization, however, the material may be calcined to a somewhat higher temperature of say of the order of about 600° to 1000° C. to increase its stability and perhaps decrease its polymerizing effect.

The thusly treated nitrogen free stream is passed from reactant 9 through heater 12 and is increased in temperature therein to a suitable reforming temperature of say about 900° F. and introduced into contact with the platinum-alumina combined halogen catalyst in reforming reactor 15. While the weight hour space velocity through reactor 15 may be within the range of from about 0.5 to 20, and the hydrogen to hydrocarbon ratio may lie within the range of from about 1.0 to about 8.0, a specific embodiment utilizes a space velocity of 3 and a hyrogen to hydrocarbon ratio of say 4. Preferably, as hereinbefore set forth, however, lower space velocities and H₂/HC ratio are used in the reforming stage than those used in the first reactor. The resulting product stream is passed from reactor 15 to the separator 20 as hereinbefore set forth, and reformate withdrawn by way of line 26 and hydrogen recycled by way of line 21, compressor 23, and line 2.

We would prefer to use fixed beds of catalyst in the process, within each of the reactor chambers, although other types of operation may be utilized, such as the fluidized process or the fluidized-fixed bed operation, the suspensoid flow, or the moving bed type of operation. Ordinarily, the catalyst in each step will be contained in one or more reactors. Pretreating and reforming reactors may be adiabatic reactors, although a cooled pretreating reactor may be utilized during the first stage of the operation, as well as for the first portion of the reforming step.

Provision may also be made for effecting the regeneration or reactivation of the solid phosphoric, as used in reactor 9, by the use of more than one reactor and by providing means for passing water or other suitable reactivating medium into contact with the catalyst to remove the ammonia and other nitrogenous compounds which may be held within the acid containing chamber.

We claim as our invention:

1. In a catalytic reforming of a gasoline fraction containing substantially large quantities of nitrogen compounds detrimental to the reforming catalyst and having depressing effect on hydrocracking, the improved method of operation which comprises contacting the said fraction in the presence of excess hydrogen with a platinum-alumina combined halogen catalyst and effecting the saturation of the charge stream and the cracking of said nitrogen compound therein, passing the contacted charge stream with resulting ammonia and without intentional cooling into contact with a bed of solid poly-phosphoric acid catalyst which has been calcined at a temperature of from about 600° C. to about 1000° C. and effecting thereby the removal of said ammonia from said fraction, and subjecting the resulting nitrogen-free gasoline fraction to catalytic reforming in the presence of a platinum-alumina, combined halogen reforming catalyst to effect thereby a gasoline of enhanced octane number.

2. The method of claim 1 further characterized in that said gasoline fraction contacts said platinum-alumina combined halogen catalyst in the first stage of contact at a lower temperature than that maintained in the second stage reforming contact, and said fraction contacts the catalyst in the first stage of contact at a higher space velocity and a higher hydrogen to hydrocarbon ratio than maintained in the second stage of contact.

3. The method of claim 2 still further characterized in that said gasoline fraction contacts the first-mentioned platinum-alumina combined halogen catalyst at a temperature within the range of from about 500° to 900° F., a space velocity of from about 4 to 20, and a hydrogen to hyrocarbon ratio of from about 2 to 10, and said nitrogen-free gasoline fraction contacts the second-mentioned platinum-alumina combined halogen catalyst in the reforming step at a temperature of from about 750° to 1000° F., a space velocity of from about 0.5 to about 20, and a hydrogen to hydrocarbon ratio of from about 1.0 to about 8.0.

4. The method of claim 1 further characterized in that said solid phosphoric acid catalyst is a mixture of a polyphosphoric acid with a siliceous adsorbent which has been calcined to a temperature of from about 600° C. to 1000° C.

5. In the conversion of a gasoline fraction in a reforming process involving hydrocracking in the presence of a catalyst comprising platinum and alumina, said gasoline fraction containing nitrogen compounds having a depressing effect on the hydrocracking reaction and a poisoning effect on said catalyst, the method which comprises contacting the gasoline fraction in the presence of hydrogen with a hydrogenation-dehydrogenation catalyst to crack said nitrogen compounds and form ammonia therefrom, contacting the resultant products with a solid phosphoric acid catalyst which has been calcined at a temperature of from about 600° C. to about 1000° C. to separate the ammonia from the gasoline fraction, and thereafter reforming the gasoline fraction in the presence of said catalyst comprising platinum and alumina.

6. The process of claim 5 further characterized in that the gasoline fraction contains olefins which are saturated during said contact with the hydrogenation-dehydrogenation catalyst.

7. In the conversion of a gasoline fraction in a reforming process involving hydrocracking in the presence of a catalyst comprising platinum and alumina, said gasoline fraction containing nitrogen compounds having a depressing effect on the hydrocracking reaction and a poisoning effect on said catalyst, the method which comprises contacting the gasoline fraction in the presence of hydrogen with a hydrogenation-dehydrogenation catalyst to crack said nitrogen compounds and form ammonia therefrom, contacting the resultant products with a mixture of poly-phosphoric acid and a siliceous adsorbent which has been calcined at a temperature of from about 600° C. to about 1000° C. to separate the ammonia from the gasoline fraction, and thereafter reforming the gasoline fraction in the presence of said catalyst comprising platinum and alumina.

References Cited in the file of this patent

UNITED STATES PATENTS

| | | |
|---|---|---|
| 2,295,125 | Nelson | Sept. 8, 1942 |
| 2,393,288 | Byrns | Jan. 22, 1946 |
| 2,411,726 | Holroyd et al. | Nov. 26, 1946 |
| 2,479,110 | Haensel | Aug. 16, 1949 |